(12) United States Patent
Manolov et al.

(10) Patent No.: US 7,469,256 B1
(45) Date of Patent: *Dec. 23, 2008

(54) CACHED PERSISTENT DATA MANAGEMENT THROUGH STATE TRACKING

(75) Inventors: Svetoslav H. Manolov, Sofia (BG); Ivo V. Simeonov, Sofia (BG)

(73) Assignee: SAP AG, Walldorf (DE)

( * ) Notice: Subject to any disclaimer, the term of this patent is extended or adjusted under 35 U.S.C. 154(b) by 550 days.

This patent is subject to a terminal disclaimer.

(21) Appl. No.: 10/835,751

(22) Filed: Apr. 29, 2004

(51) Int. Cl.
*G06F 17/00* (2006.01)
(52) U.S. Cl. .................................................. 707/102
(58) Field of Classification Search ................ 707/102, 707/204; 711/100; 718/101, 102; 719/330
See application file for complete search history.

(56) References Cited

U.S. PATENT DOCUMENTS

| | | | |
|---|---|---|---|
| 4,841,434 A | 6/1989 | Mathewes, Jr. et al. | |
| 5,499,371 A | 3/1996 | Henninger et al. | |
| 5,878,407 A | 3/1999 | Olgac | |
| 6,182,086 B1 * | 1/2001 | Lomet et al. ................. | 707/202 |
| 6,360,223 B1 | 3/2002 | Ng et al. | |
| 6,453,325 B1 * | 9/2002 | Cabrera et al. .............. | 707/204 |
| 6,714,943 B1 | 3/2004 | Ganesh et al. | |
| 6,728,719 B1 | 4/2004 | Ganesh et al. | |
| 6,912,569 B1 | 6/2005 | Sharma et al. | |
| 6,980,988 B1 | 12/2005 | Demers et al. | |
| 2002/0035673 A1 | 3/2002 | Roseborough et al. | |
| 2002/0040409 A1 | 4/2002 | Matena et al. | |
| 2002/0049603 A1 | 4/2002 | Mehra et al. | |
| 2002/0069157 A1 | 6/2002 | Jordan | |
| 2002/0152422 A1 | 10/2002 | Sharma et al. | |
| 2003/0058277 A1 * | 3/2003 | Bowman-Amuah ......... | 345/765 |
| 2003/0120659 A1 | 6/2003 | Sridhar | |
| 2003/0140308 A1 | 7/2003 | Murthy et al. | |
| 2003/0163479 A1 | 8/2003 | Mathews et al. | |
| 2003/0172091 A1 | 9/2003 | Norcott | |
| 2003/0177477 A1 | 9/2003 | Fuchs | |
| 2003/0182461 A1 | 9/2003 | Stelting et al. | |
| 2004/0133487 A1 | 7/2004 | Hanagan et al. | |
| 2004/0172385 A1 | 9/2004 | Dayal | |
| 2005/0033730 A1 | 2/2005 | Chaudhuri et al. | |
| 2005/0050068 A1 | 3/2005 | Vaschillo et al. | |

(Continued)

OTHER PUBLICATIONS

Pavlov, Vladimir K., "System and Method For Transparent Persistence Management", U.S. Appl. No. 10/836,159, filed Apr. 29, 2004.

(Continued)

*Primary Examiner*—Uyen Le
(74) *Attorney, Agent, or Firm*—Blakely, Sokoloff, Taylor & Zafman LLP

(57) ABSTRACT

A method is described in which, during execution of a distributed transaction, a representation of persistent data stored at an entry in a database is placed into a cache. Then, in response to an application's decision that the entry should be removed from the database, the representation is kept in the cache and marked as corresponding to an entry that is to be removed from the database. Then, during execution of the distributed transaction's two-phase commit protocol, the database is informed that the entry is to be removed from the database if the representation was marked as corresponding to an entry that is to be removed from the database when the application completed its execution for the distributed transaction.

45 Claims, 8 Drawing Sheets

U.S. PATENT DOCUMENTS

| | | | |
|---|---|---|---|
| 2005/0097187 | A1 | 5/2005 | Thompson et al. |
| 2005/0203920 | A1 | 9/2005 | Deng et al. |
| 2005/0240556 | A1 | 10/2005 | Larson et al. |
| 2005/0240577 | A1 | 10/2005 | Larson et al. |

OTHER PUBLICATIONS http://dev.mysql.com/doc/refman/4.1/en/char.html, 4.

http://jaffa.sourceforge.net/documentation/persistence/engines. html, Last Modified: Thur Jun. 26, 2003 at 6:05:27pm.

http://java.sun.com/j2se/1.3/docs/api/java/sql/Blob.html, 2001, (2001).

http://en.wikipedia.org/wiki/Constructor_%28computer_science%29,accessed 31 October 2006. (Oct. 31, 2006).

"BEA WebLogic Server and WebLogic Express 8.1 Documentation", http://e-docs.bea.com/wls/docs81/kindex.html, 3.

"java.lang.String", http://www.cafeaulait.org/course/week4/53.html, 8 March 2003, 2 pages.

"Oracle Technology Network", http://www.oracle.com/technology/index.html, 2 pages.

"Programming WebLogic Enterprise JavaBeans", http://edocs.bea.com/wls/docs70/html, WebLogic Server 7.0 (Jul. 22, 2004), 1-33.

"SAMS Teach Yourself EJB in 21 Days", Ragae Ghaly and Krishna Kothapalli, "SAMS Teach Yourself EJB in 21 Days" 2003, pp. 353-376 (2003), pp. 353-376.

"SAP & Tommorow Now Support", http://www.java2s.com/Code/Java/Database-SQL-JDBC/Createabledatatype.htm, Copyright 2003-04 Demo Source and Support.

Huber, Bernhard, Huber, Bernhard, http://cocoon.apache.org/2.0/userdocs/readers/database-reader.html, 25 December 2002.

Oracle Technology Network, "Oracle Application Server 10g (9.0.4) Documentation" 2 pages, http://otn.oracle.com/documentation/appserver10g.html Printed on Jul 22, 2004.

Oracle Technology Network, "Oracle9*i* Application Server Release 2 Documentation" 1 page, http://otn.oracle.com/documentation/ias.html Printed on Jul. 22, 2004.

Barry, D., "Web Services and Service-Oriented Architectures" 4 pages, http://service-architecture.com/index.html Printed on Jul. 22, 2004.

Barry & Associates, "Online articles" 2 pages, http://www.service-architecture.com/articles/index.html Printed on Jul. 22, 2004.

Barry & Associates, "Web Services articles" 3 pages, http://www.service-architecture.com/web-services/articles/index.html Printed on Jul. 22, 2004.

Barry & Associates, "Application server articles" 2 pages, http://www.service-architecture.com/application-servers/articles/index.html Printed on Jul. 22, 2004.

Barry & Associates, "Object database articles" 2 pages, http://www.service-architecture.com/object-oriented-databases/articles/index.html Printed on Jul. 22, 2004.

Barry & Associates, "Relational database articles" 2 pages, http://www.service-architecture.com/relational-databases/articles/index.html Printed on Jul. 22, 2004.

Barry & Associates, "XML database articles" 2 pages, http://www.service-architecture.com/xml-databases/articles/index.html Printed on Jul. 22, 2004.

Barry & Associates, "XML middleware articles" 2 pages, http://www.service-architecture.com/xml-middleware/articles/index.html Printed on Jul. 22, 2004.

Barry & Associates, "Reprint policy" 2 pages, http://www.service-architecture.com/reprint_.html Printed on Jul. 22, 2004.

Barry & Associates, "Object-relational mapping articles and products" 2 pages, http://www.service-architecture.com/object-relational-mapping/index.html Printed on Aug. 24, 2004.

Related Office Action mailed May 9, 2008, U.S. Appl. No. 10/836,159, filed Apr. 29, 2004, "System and Method for Transparent Persistence Management" 21 pages.

* cited by examiner

CACHED PERSISTENT DATA MANAGEMENT THROUGH STATE TRACKING

FIELD OF INVENTION

The field of invention relates generally to computing; and, more specifically, to cached persistent data management through state tracking.

BACKGROUND

The information systems of a modern day enterprise (such as a corporation or government institution) are often responsible for managing and performing automated tasks upon large amounts of data. Persistent data is that data that "exists" for extended periods of time (i.e., "it persists"). Persistent data is typically stored in a database so that it can be accessed as needed over the course of its existence. Here, complex "database software" (e.g., such as DB2, Oracle, and SQL Server) is often used to actually read the data and perhaps perform various intelligent functions with it. Frequently, persistent data can change over the course of its existence (e.g., by executing a series of reads and writes to the data over the course of its existence). Moreover, multiple items of different persistent data may change as part of a single large scale "distributed transaction".

A distributed transaction is a transaction that involves more than one database or server. Distributed transactions frequently involve multiple databases accessed through multiple servers that are interconnected by a network. Because of the use of multiple databases, distributed transactions are an attempt at some sort of comprehensive function that serves the enterprise's needs. For example, in the case of an airline, a single distributed transaction might be used to manage an internet connection to a potential customer who may reserve a particular seat on a particular flight. Here, note that a number of different databases may be involved in a single distributed transaction that is executed for the customer's experience with the airline's on-line ticketing and reservation system.

For example, assume the distributed transaction is expected to: 1) provide the potential customer with flight scheduling, pricing and seating information; 2) record the customer's name, address, credit card, and email information if any flight is reserved by the customer; 3) update the seating information for each seat reserved by the customer; 4) update the customer's frequent flier mileage records if the customer is registered in the airline's frequent flier program; 5) update the airline's accounting records to reflect the new revenue introduced by each flight reservation made by the customer; and, 6) invoice the customer using the customer's credit card information.

Here, a number of different databases may be involved in the distributed transaction such as: 1) a first database that keeps track of the airline's flight scheduling information; 2) a second database that keeps track of information specific to a particular flight such as seating information; 3) a third database that keeps track of flight pricing information; 4) a fourth flight that keeps track of each customer's name, address and email information; 5) a fifth database that keeps track of each frequent flier's mileage; 6) a sixth database that keeps track of the airline's accounting records; and 7) a seventh database that keeps track of the airline's invoicing records.

FIGS. 1a and 1b depict how a distributed transaction is typically carried out by an enterprise's information system infrastructure. A protocol, referred to as the "two-phase commit" protocol is used to ensure that either a distributed transaction's database updates are successfully completed in their entirety; or, the distributed transaction is not effected at all. By ensuring that database updates for a distributed transaction are either completely carried out or not carried out at all, incorrect database records are avoided (e.g., a seat being reserved for a reservation that is not actually made, a seat not being reserved for a reservation that is actually made, etc.). FIG. 1a corresponds to a two-phase commit protocol in which all of distributed transaction's database updates are recorded. FIG. 1b corresponds to a two-phase commit protocol in which none of distributed transaction's database updates are recorded.

The example of FIG. 1a shows four servers $101_1$ through $101_4$, each coupled to its own corresponding database $102_1$ through $102_4$; where, each of the databases is to be updated with new information upon completion of the distributed transaction's various calculations. That is, first a distributed transaction performs its various tasks and calculations with the data that it uses; then, upon completion of these tasks and calculations, the distributed transaction's databases are updated with any updates needed to be made to their respective data as a consequence of the distributed transaction's full execution.

Each server $101_1$ through $101_4$ includes its own resource manager module $103_1$ through $103_4$ that is responsible for communicating with a particular database. The resource manager can often be viewed as driver software that is used to send specific functional commands to the database software in response to requests/commands made by higher level software functions. The commands sent to a database are typically scripted in some form of database language (e.g., Structured Query Language (SQL)). Examples of resource managers include a Java Database Connectivity (JDBC) driver that is presently part of the J2EE platform and an Open Database Connectivity (ODBC) driver provided by Microsoft Corporation.

A transaction manager module 104 is responsible for, typically among other responsibilities, implementing the two-phase commit protocol with those resource managers that communicate to a database that is to be updated after a distributed transaction's calculations have been executed. In the examples of FIGS. 1a and 1b, each of databases $102_1$ through $102_4$ are assumed to require some portion of their data to be changed as a consequence of the distributed transaction's completed execution. The transaction manger 104 therefore coordinates a sequence of messaging exchanges between itself and resource managers $103_1$ through $103_4$. Examples of transaction manager modules include the API and logic behind the Java Transaction API (JTA) that is part of the J2EE platform and the Microsoft Distributed Transaction Coordinator (MDTC) from Microsoft Corporation. A high level exemplary review of the messaging used to implement a two phase commit protocol immediately follows.

Once a distributed transaction's calculations are completed so that all database changes to be made as a consequence of the transaction's execution are known (e.g., entry of a specific reserved seat on a specific flight, etc.), the first phase of the two-phase commit protocol begins with the transaction manager 104 receiving a "commit" command 1 from another portion of the distributed transaction's software (e.g., "a client" or "container" that executes higher level functions of the distributed transaction). In response to the received "commit" command 1, the transaction manager 104 sends "prepare" commands 2 to each of the resource managers $103_1$ through $103_4$. Note that, because a network 105 resides between the server $101_1$ that contains the transaction manager 104 and servers $101_2$ through $101_4$, those of the "prepare" commands 2 that are sent to servers $101_2$ through $101_4$ pass through network 105.

In response to the received "prepare" commands 2, each resource manager forwards a "prepare" command 3 to its corresponding database in the appropriate language format (e.g., SQL). Each database $102_1$ through $102_4$ performs what is akin to a "soft write" of the new, updated information. That is, for example, each database runs through all internal routines just short of actually writing the new, updated information. If a problem is not detected by a database (e.g., an incompatibility in the data) just short of the actual write of the updated information, a database reports a "ready" response. In FIG. 1a, each database reports a "ready" response 4; and, in FIG. 1b, databases $102_1$ through $102_3$ report a "ready" response while database $102_4$ reports a "rollback" response 11.

A "rollback" response means that a database has recognized some problem in preparing itself to actually write its updated information. As a consequence, a "rollback" response essentially means that the new information cannot be written. Given that all new information of distributed transaction must be written or no new information from a distributed transaction may be written, as shall become evident in more detail immediately below, the "ready" response of each server in FIG. 1a results in all of the new information being written to each server; while, the single "rollback" response 11 in FIG. 1b results in no new information being written to any server. The situation of FIG. 1a therefore corresponds to a situation in which the distributed transaction "takes effect"; while, the situation in FIG. 1b corresponds to the distributed transaction as not being recognized as ever having being executed.

In FIGS. 1a and 1b, the responses of each of the databases $102_1$ through $102_4$ (e.g., "ready" responses 5 in FIG. 1a) are forwarded to the transaction manager by the resource managers $103_1$ through $103_4$. The reception of these responses by the transaction manager 104 marks the end of the first phase of the two-phase commit protocol.

The transaction manager's sending of a second set of messages in response to the received responses marks the beginning of the second phase. Because the transaction manager 104 receives all "ready" responses from the resource managers $103_1$ through $103_4$ in the situation of FIG. 1a, the transaction manager responds with the sending of a set of "commit" messages 6 to the resource managers $103_1$ through $103_4$. The resource managers $103_1$ through $103_4$ forward 7 the "commit" command to their respective databases $102_1$ through $102_4$ which, in turn, causes the prepared data to be actually written into each. The databases confirm that the data updates have been successfully written by sending a "committed" response 8 to their corresponding resource managers. The resource managers then forward 9 these messages to the transaction manager 104. The transaction manager 104 then responds to the original commit command 1 with a committed response 10. At this point all databases to be updated with new information are updated and the second phase of the two-phase commit protocol is complete.

In FIG. 1b, the reception of the rollback message from server $101_4$ by the transaction manager 104 causes the transaction manager 104 to send rollback messages 12 to each of the resource managers $103_1$ through $103_4$ and to inform the higher level software that the new data could not be committed 13. These rollback messages 11 are then effectively forwarded 14 to the databases $102_1$ through $102_4$; which, in turn, causes each of servers $102_1$ through $102_3$ to cancel their prepared writes of new information. As such, no new information is written into any of the databases $102_1$ through $102_4$.

SUMMARY

A method is described in which, during execution of a distributed transaction, a representation of persistent data stored at an entry in a database is placed into a cache. Then, in response to an application's decision that the entry should be removed from the database, the representation is kept in the cache and marked as corresponding to an entry that is to be removed from the database. Then, during execution of the distributed transaction's two-phase commit protocol, the database is informed that the entry is to be removed from the database if the representation was marked as corresponding to an entry that is to be removed from the database when the application completed its execution for the distributed transaction.

FIGURES

DETAILED DESCRIPTION

An issue with distributed transactions is the ability to identify, from the contents of a cache, the changes that the execution of a distributed transaction's two-phase commit protocol are to import to a database's persistent data. Recall from the background that a distributed transaction first performs its various "business logic" application tasks and calculations with the persistent data that it uses; then, upon completion of these tasks and calculations, one or more databases used by the distributed transaction are updated with any persistent data changes resulting from the distributed transaction's full execution.

The execution of software program code can be viewed as the execution, by a computing system's processing core (such as a plurality of processors that cooperate as a functional whole within the computing system), of a series of instructions that take action upon/with specific elements of data. A computing system typically includes internal random access memory (RAM), also referred to as "cache", that stores these instructions and data elements and forwards them to the computing system's processing core. As traditionally used in the business application software arts, the term "cache" encompasses both system RAM (currently and traditionally implemented with DRAM memory) and processor cache RAM (currently and traditionally implemented with SRAM memory). Conceivably, the term "cache" could also be extended to include the computing system's own hard drive (not shown in FIG. 2) or other high speed storage elements.

Figure 1A:
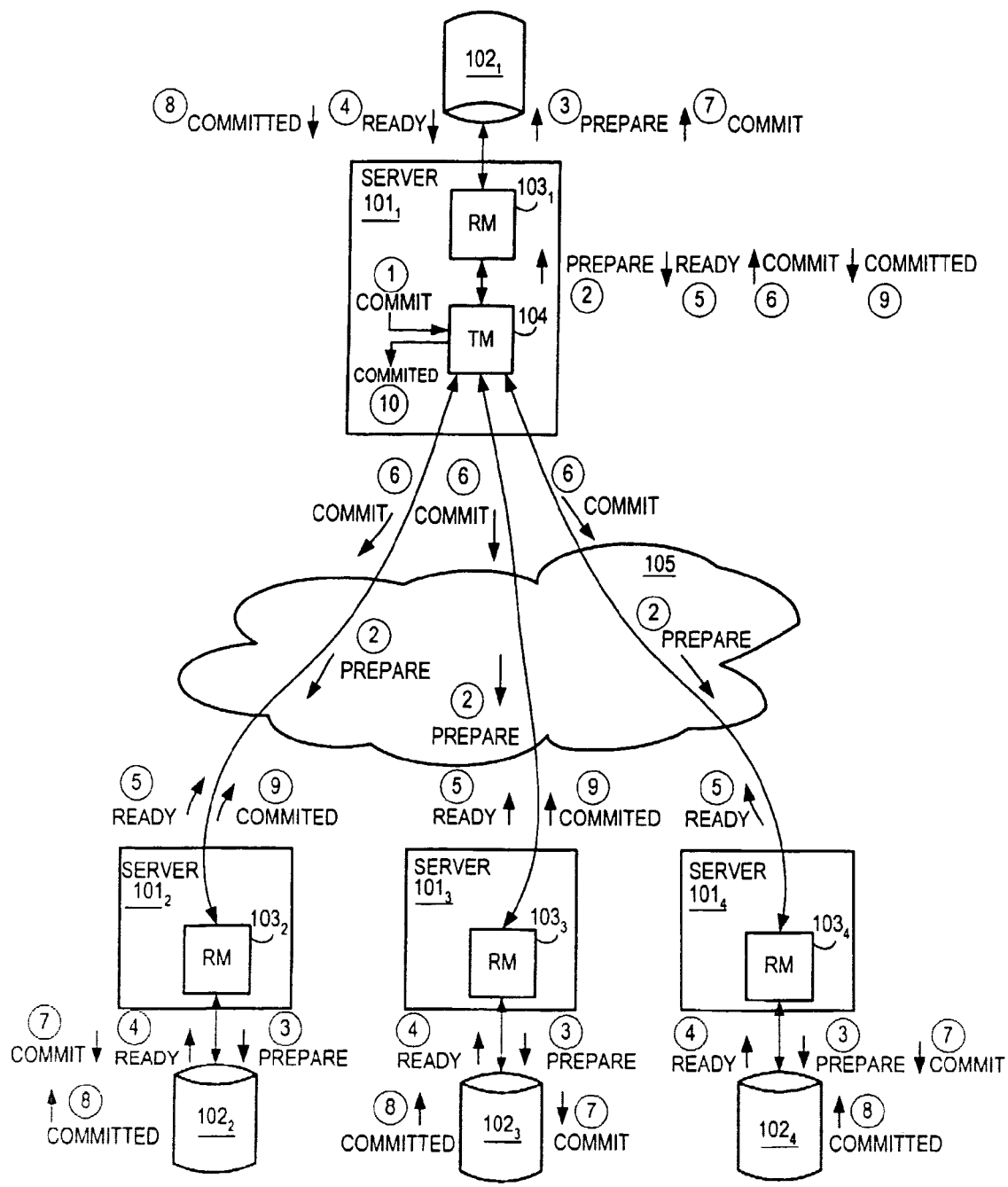
FIG. 1a (prior art) shows a two phase commit protocol distributed transaction that concludes with all updates being made to their respective databases.
Figure 1B:
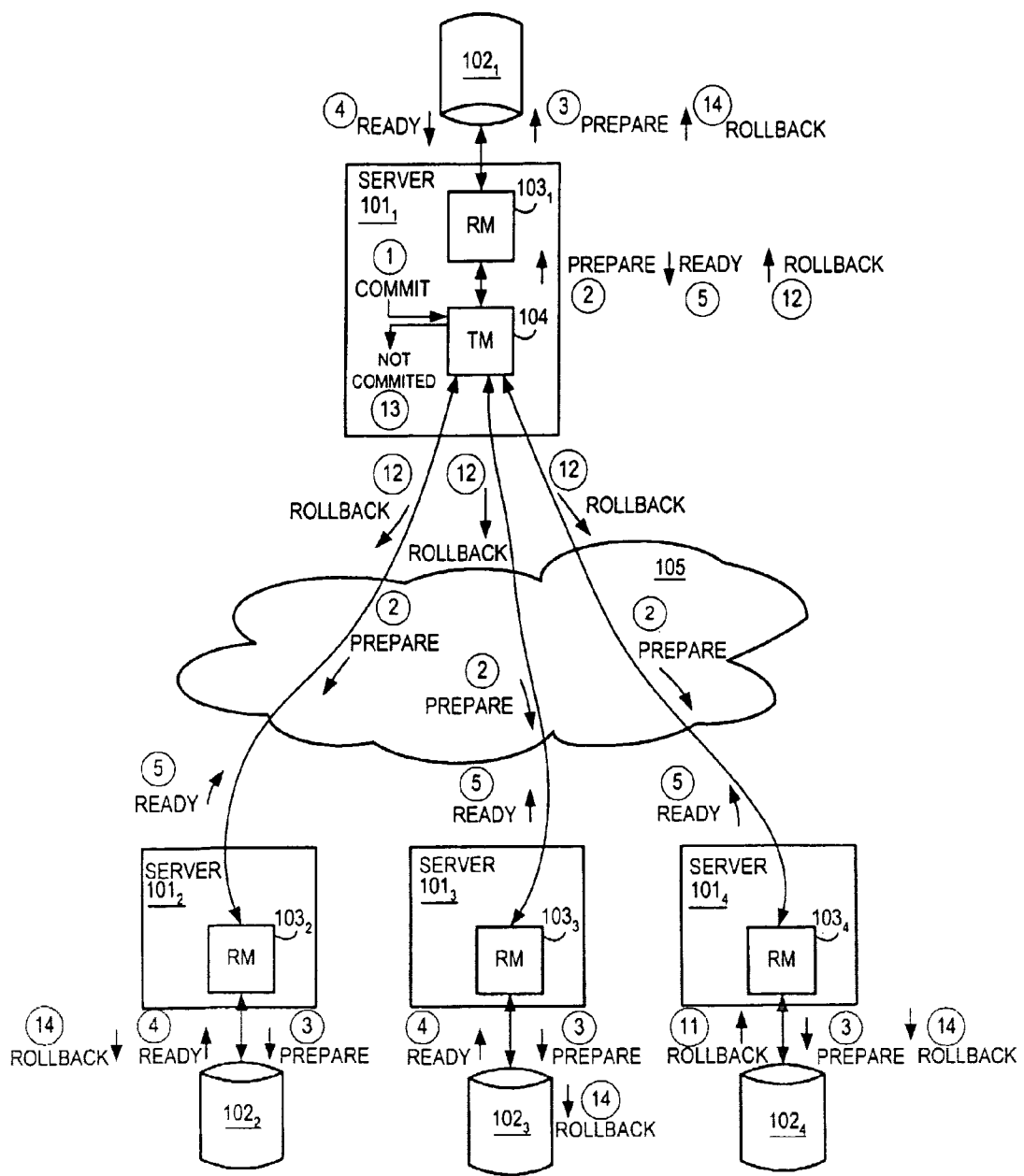
FIG. 1b (prior art) shows a two phase commit protocol distributed transaction that concludes with no updates being made to any databases.
Figure 2:
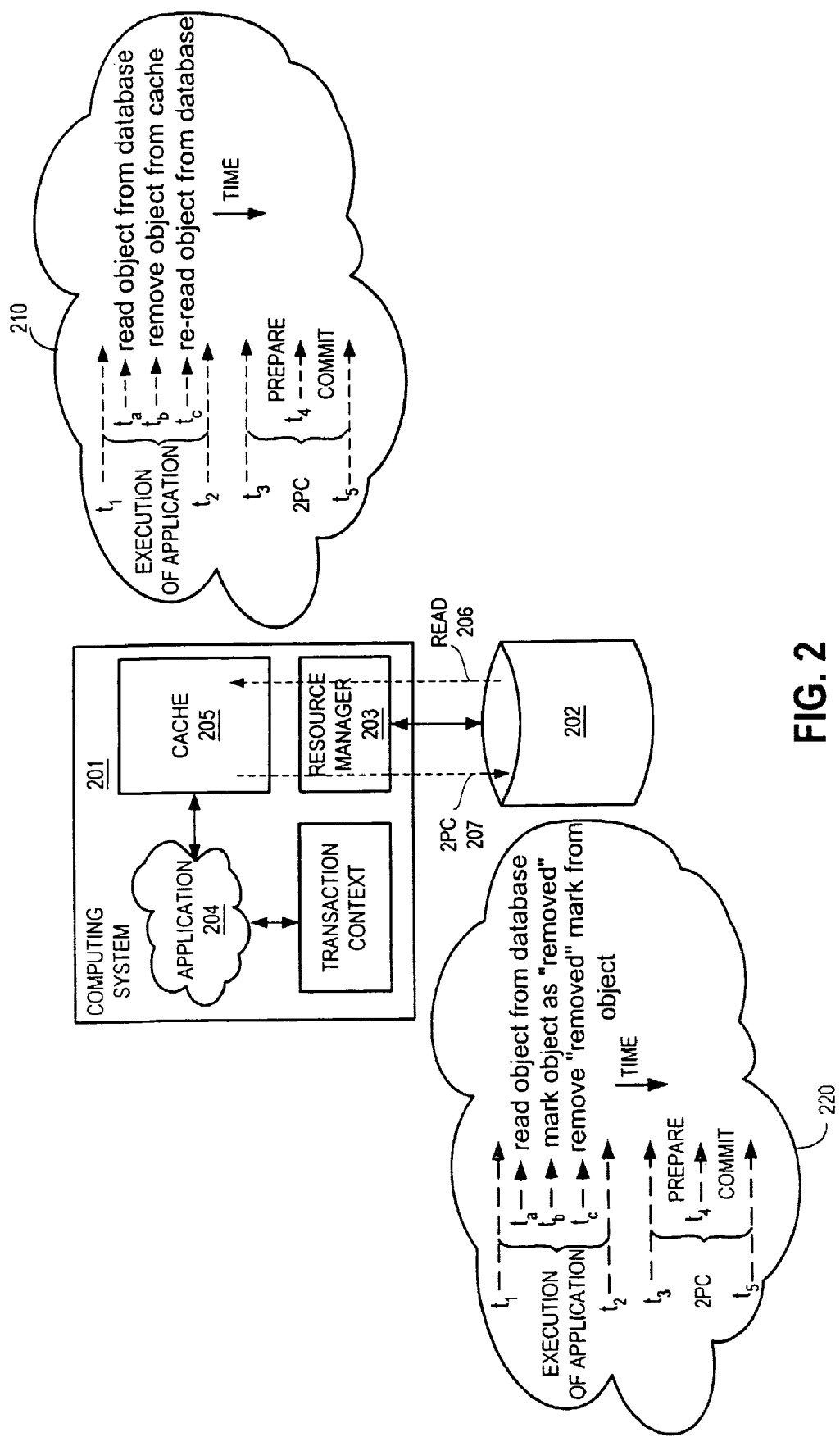
FIG. 2 shows a server having a cache coupled to a database.

As a distributed transaction operates upon/with the persistent data stored in a database, FIG. 2 illustrates a high performance sub-system for executing that portion of a distributed transaction's business logic that uses information stored in a particular database 202. FIG. 2 shows a high performance computing system 201 (e.g., a server or workstation) coupled to a database 202.

The computing system 201 may be a Java 2 Enterprise Edition ("J2EE") server node which supports Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

The computing system 201 is used to perform the business logic application software 204 of a distributed transaction. Use of the high performance computing system 201 to perform a distributed transaction's business logic application 204 greatly enhances the speed at which the transaction can be performed (as compared to having the database software perform the business logic software itself correct?). Note that in a J2EE environment, the application 204 can be implemented with session beans in an EJB container of the computing system while in other component based environments the application 204 can be implemented with the applicable components.

For a particular distributed transaction, the basic operation of the sub-system of FIG. 2 is as follows: 1) first, persistent data used by the distributed transaction is transferred from the database 202 to the computing system's cache 205 (e.g., using one or more read operations 206 with a resource manager 203) and is processed by the applicable business logic application software 204 for the distributed transaction; and, 2) after the distributed transaction's business logic application software 204 is sufficiently complete so that the changes needed to be made to the persistent data as a consequence of the application software's 204 execution are known, new persistent data is transferred to the database 202 by way of the two-phase commit protocol ("2PC") 207.

Inset 210 shows a problem that can arise in the efficiency of the operation of the sub-system of FIG. 2. According to the timing diagram observed in inset 210, "1)" from the immediately preceding paragraph occurs between times $t_1$ and $t_2$; and, the two-phase commit protocol of "2)" from the immediately preceding paragraph above occurs between times $t_3$ and $t_5$ (noting that a prepare command is issued to the database 202 between times $t_3$ and $t_4$ and a commit command is issued to the database 202 between times $t_4$ and $t_5$).

Inset 210 assumes that an object-oriented environment applies (hence items of data read from database 202 are represented as "objects" within the cache). Here, for a J2EE application, each object may be used to implement an entity bean. Those of ordinary skill will appreciate that the present teachings need not be applied solely to object-oriented environments. More generally, the cached objects being discussed herein can be viewed as a type of cached representation of database data.

Consider an execution of the application software 204 where a specific item of persistent data is: 1) at time $t_a$, "needed" by the application software 204 so as to be read from the database 202 and put into cache 205; 2) at time $t_b$, deemed "no longer needed" in the database by the application 204 and erased from the cache; and, 3) at time $t_c$, deemed needed again by the application 204 so as to cause another read for it from the database 202 (i.e., the application software 204 reverses its position on the data from that of 2) just above). In this situation, inefficiency results because of the second read for the same data that occurs at time $t_c$. Because of the complexity and delay associated with reading an item of persistent data from database 202 (as compared to how quickly it could have been accessed from cache 205 had it not been eradicated at time $t_b$), the time needed to complete application 204 may be extended because the application 204 "waited" a second time for the data to read from the database 202.

An improved approach would be to preserve an item in cache 205 even if an application deems it is "no longer needed". As a consequence, an application's need of an item from the database should result in that entry only being read once from the database (because it is never removed from the cache). In order to comply with the rule that a database entry is only transferred once from the database to the cache for a particular distributed transaction, specific states are given to each cached object. For example according to at least one embodiment, and referring to FIGS. 3a through 3d, a cached object representing an entry of persistent data in the database is given one of the following states: 1) "default"; 2) "update"; 3) "remove"; 4) "create"; and, 5) "virtually removed". Each of these are discussed below.

A "default" state signifies that a cached object contains the same data as its counterpart within the database. That is, there is no difference between the data in cache and the corresponding data in the database. Thus, when a data entry is read from the database and stored in the cache as an object, the object enters the cache in the default state. Moreover, those objects used by a distributed transaction's application that exist in the default state at the end of the application's execution need not be rewritten to the database during the two-phase commit protocol of the transaction. That is, because the data in cache is the same as the data in the database for these objects, no activity needs to be applied to update the database.

Figure 3A:
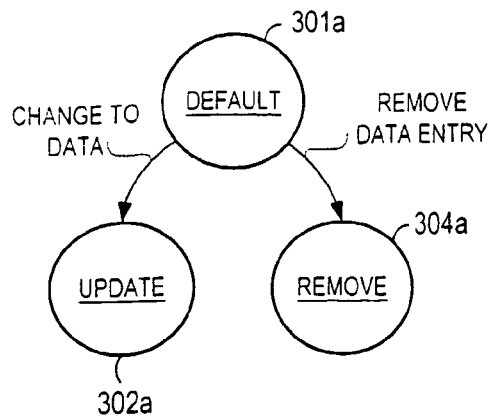
FIGS. 3a through 3d shows state changes for cached representations of persistent data.

Referring to FIG. 3a, if the application happens to change the data of a cached object in the default state 301a during its execution in support of the transaction, the object's state is changed to the "update" state 302a. The update state 302 indicates that there is a difference between the data in cache and the corresponding data in the database. As such, the data in the database is presently stale. Therefore, those objects used by a distributed transaction's application that exist in the update state at the end of the application's execution should be written to the database during execution of the transaction's two-phase commit protocol. Here, because the data in cache is not the same as the corresponding data in the database for these objects, the changes to the data carried by these objects need to be applied to the database.

Again referring to FIG. 3a, if the application decides that the data of a cached object in the "default" state is no longer useful (or otherwise determines that its corresponding entry in the database should be removed), the object's state is changed to the "remove" state 304a. The significance of a cached object being in the removed state 304 is that the cached object's corresponding database entry should be removed from the database. Therefore, for each object that exists in the remove state at the end of the application's execution, the database will be told to erase its corresponding entry from the database during execution of the transaction's two-phase commit protocol.

Figure 3B:
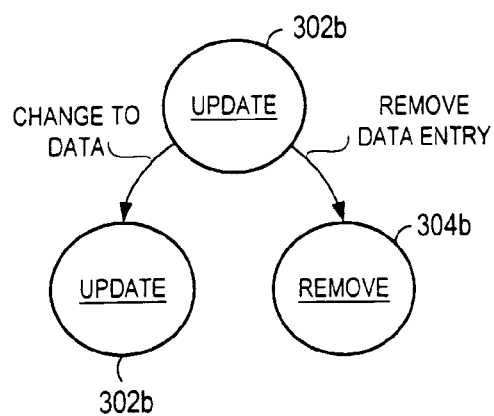

FIG. 3b shows state changes originating from a cached object in the update state 302b. If the application happens to change the data of a cached object in the update state 302b during its execution in support of a distributed transaction, the object's state is kept in the update state 302b. The implicit assumption of the above is that the new data is different than the original "default" data that the object was originally read into the cache with. That is, it is assumed that there still exists a difference between the cached data and its counterpart in the database after at least a second change of the same data item; and, therefore, an update of the database during execution of a transaction's two-phase commit protocol is still appropriate.

If the assumption is actually incorrect, it only means that the database will be over-written with data that it already possesses. Since it is expected that only infrequently will an additional data change bring data back to its original default value, the inefficiency imposed by the overwriting of same information is deemed to have little or no practical consequence. In an alternate embodiment, the "default" value of an object can be preserved within the object over its life in the cache. If an additional data change corresponds to the new data being the same as the stored value, the object may transition from the update state back to the default state.

Still referring to FIG. 3b, if the application decides that the data of a cached object in the update state 302b is no longer useful (or otherwise determines that its corresponding entry in the database should be removed), the object's state is changed to the "remove" state 304b.

Figure 3C:
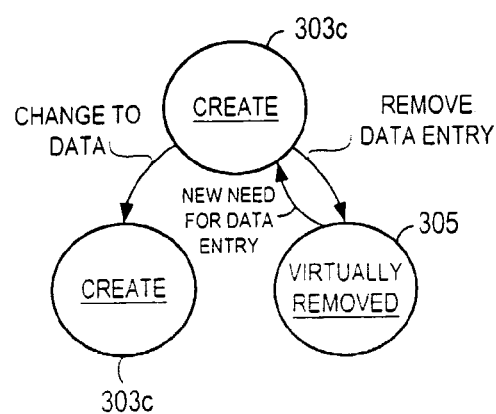

Referring to FIG. 3c, a "create" state signifies that the distributed transaction's application has created a new data entry to be listed in the database. Thus, if an application deems a new entry is be made in a database, the application creates an object in the cache that represents the new entry and places the new cached object in the create state. As such, for each object that exists in the create state at the end of the application's execution, the database will be told to add its corresponding entry into the database during execution of the transaction's two-phase commit protocol.

FIG. 3c shows possible state changes for a cached object that resides in the create state 303c. If the application changes the data of an object in the create state, the object remains in the create state 303c. Here, upon completion of the application an entry will still need to be added to the database over the course of the transaction's two phase commit protocol. Therefore, data changes to a cached object in the create state does not cause a state change. If the application decides to remove as a data entry a cached object in the create state, the cached object is placed in a "virtually removed" state 305.

The "virtually removed" state is meant to be distinguishing from the "remove" state because the decision to remove an object in the create state ultimately results in no communication to the database during execution of the transaction's two-phase commit protocol (i.e., the data's existence was purely local to the cache and the application); while, the decision to remove an object in the default or update state ultimately results in a communication to the database if the object remains in the remove state (i.e., the database has to be told to remove a data entry during execution of the two-phase commit protocol). In an alternate embodiment, the decision to remove a cached object in the create state simply results in the object being erased from the cache.

Figure 3D:
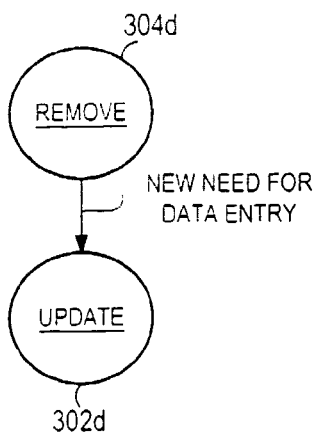

FIG. 3d shows a state transition for an object in the remove state. If an application reverses itself and decides that a database entry that was earlier deemed to be removed should now instead be in existence, the corresponding cached object for the entry changes from a remove state 304d to an update state 302d. An example, is a situation where an application decides to remove a cached object, and, subsequently, realizing that it needs the object again and thinking that the cached object has been removed, the application issues a "create" command for the same object. In this case, the software overseeing the management of the cached objects will recognize that a create command has been issued for an object that has been placed in the "remove" state; and, the state transition observed in FIG. 3d will take place for the object. Thus, the management of the cached objects happens transparently to the application.

Because a create command from the application is apt to trigger the transition observed in FIG. 3d, it is assumed that the object's "new" data is different than its counterpart in the database; and, an update of the database during execution of the two-phase commit protocol is appropriate. As discussed previously, this only means that the database will be over-written with data that it already possesses if the assumption is actually incorrect. In an alternate embodiment, as discussed above, the "default" value of an object can be preserved within the object over its life in the cache. If the data of the revived object is the same as the stored value, the object may transition from the remove state to the default state.

The situation of FIG. 3d is particularly useful to removing the inefficiency associated with inset 210 of FIG. 2 (where, as discussed above, a cached object is erased from the cache 205 upon a decision that its corresponding database entry is to be removed from the database 202). By contrast, according to an improved approach as depicted in inset 220 of FIG. 2, upon a decision that a database entry is to be removed from the database (at time $t_b$), its corresponding cached object is given the state "remove" and allowed to remain in the cache. Thus, if the application later "changes its mind" as to the removal decision, the application need not wait for the object to be "re-read" from the database 202 and instead is able to use the object directly from cache 205 (at time $t_c$) with only the added overhead of changing the state from "remove" to "update" as discussed with respect to FIG. 3d.

Keeping track of the various states as described above also provides a basis for supporting the two-phase commit protocol. Specifically, a first (remove) list may be maintained over the course of the application's execution that lists all objects having a "removed" state; a second (create) list may be maintained over the course of the application's execution that lists all objects having a "create" state; and, a third (update) list may be maintained over the course of the application's execution that lists all objects having an "update" state. These lists are then used to drive the appropriate commands to the database during the first ("prepare") phase of the two-phase commit protocol once the transaction is complete. Alternatively these lists can be generated upon completion of the application; or, at least, any list can be generated when a further change to is not expected.

A "remove" list that identifies all objects in the remove state may then be referenced to identify to the database 202 during the prepare phase (e.g., by way of resource manager 203) which database entries need to be deleted; a "create" list may be referenced to identify to the database 202 during the prepare phase (e.g., by way of resource manager 203) specific database entries that need to be created (noting that the data contained by the objects listed on the "create" list should be passed to the database 202 during the prepare phase as well); and, an "update" list may be referenced to identify to the database 202 during the prepare phase (e.g., by way of resource manager 203) specific existing database entries that need to be updated (noting that the data contained by the objects listed on the "update" list should be passed to the database 202 during the prepare phase as well).

In an embodiment, these lists are maintained by a transaction context object 208. A transaction context object 208 has been traditionally used to "keep track of" a distributed transaction within an object-oriented environment and typically includes an identity of the distributed transaction, the present state of the distributed transaction as well as other attributes. The present teachings suggest that a transaction context object 208 be enhanced to keep track of or otherwise list cached objects based on their state ("remove", "create", "update") so that the proper actions to tell the database to take during the two-phase commit protocol can be readily determined. Of course another object besides a transaction context object could be used as well.

Figure 4:
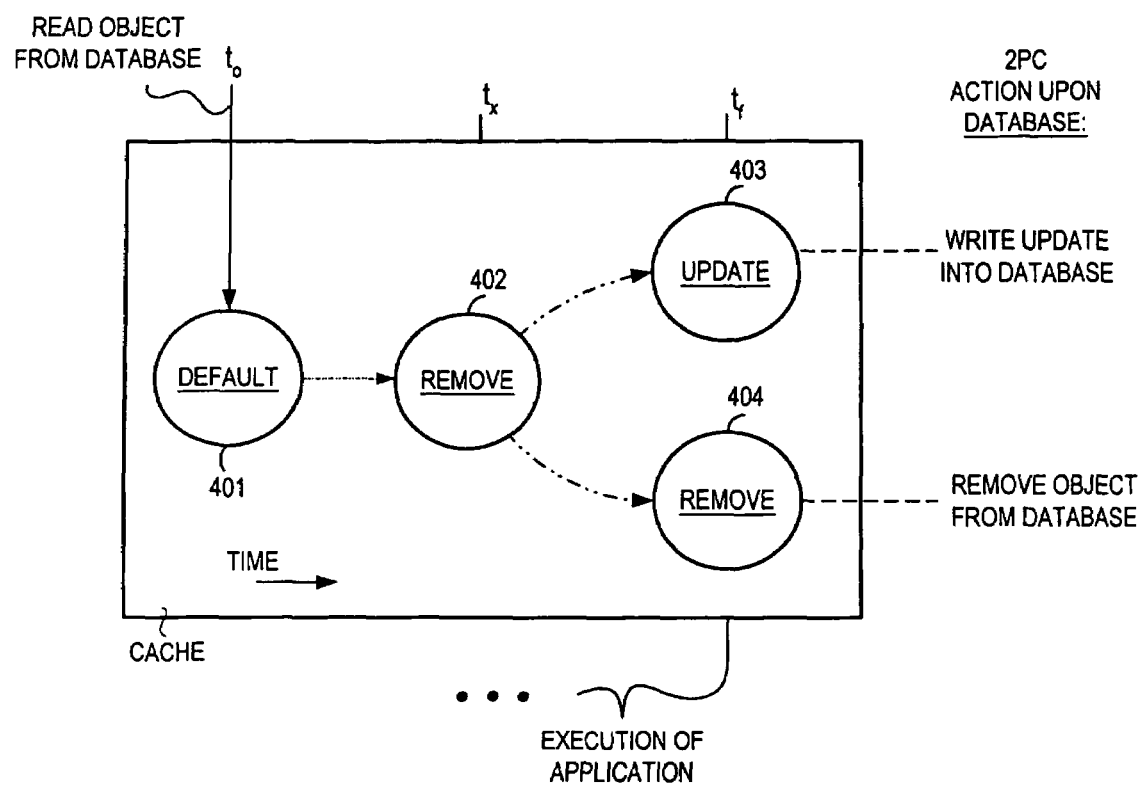
FIG. 4 shows an object stored in cache labeled as being in a REMOVE state.
Figure 5:
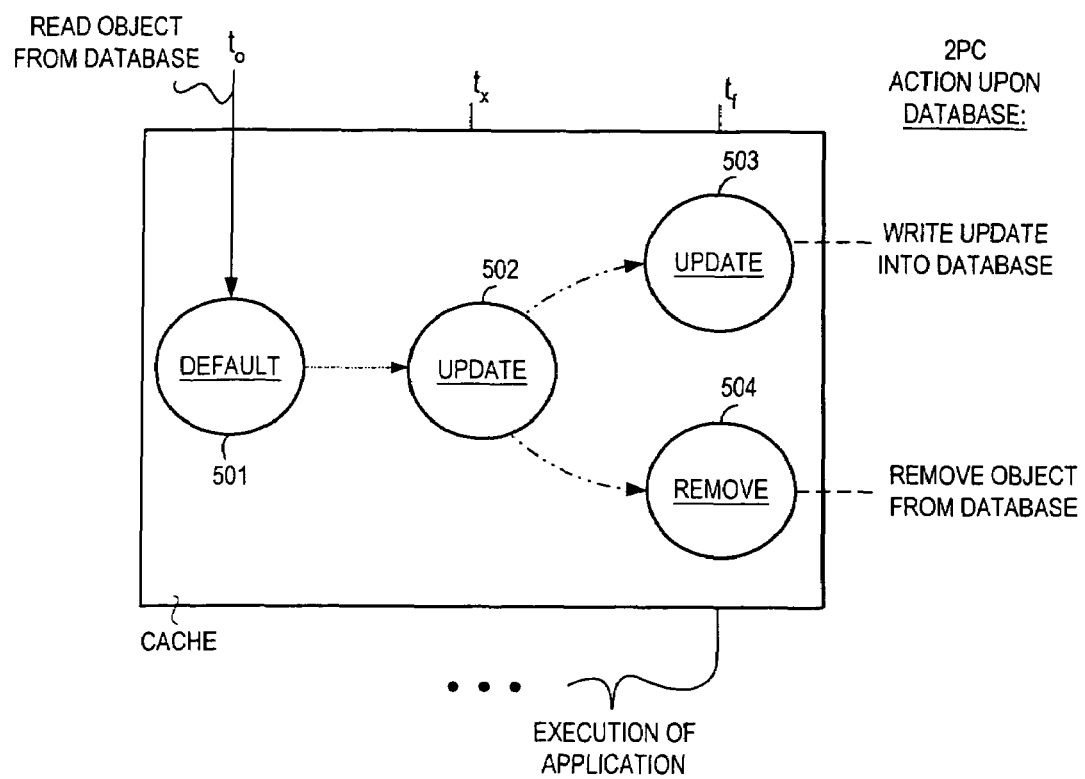
FIG. 5 shows an object stored in cache labeled as being in an UPDATE state.
Figure 6:
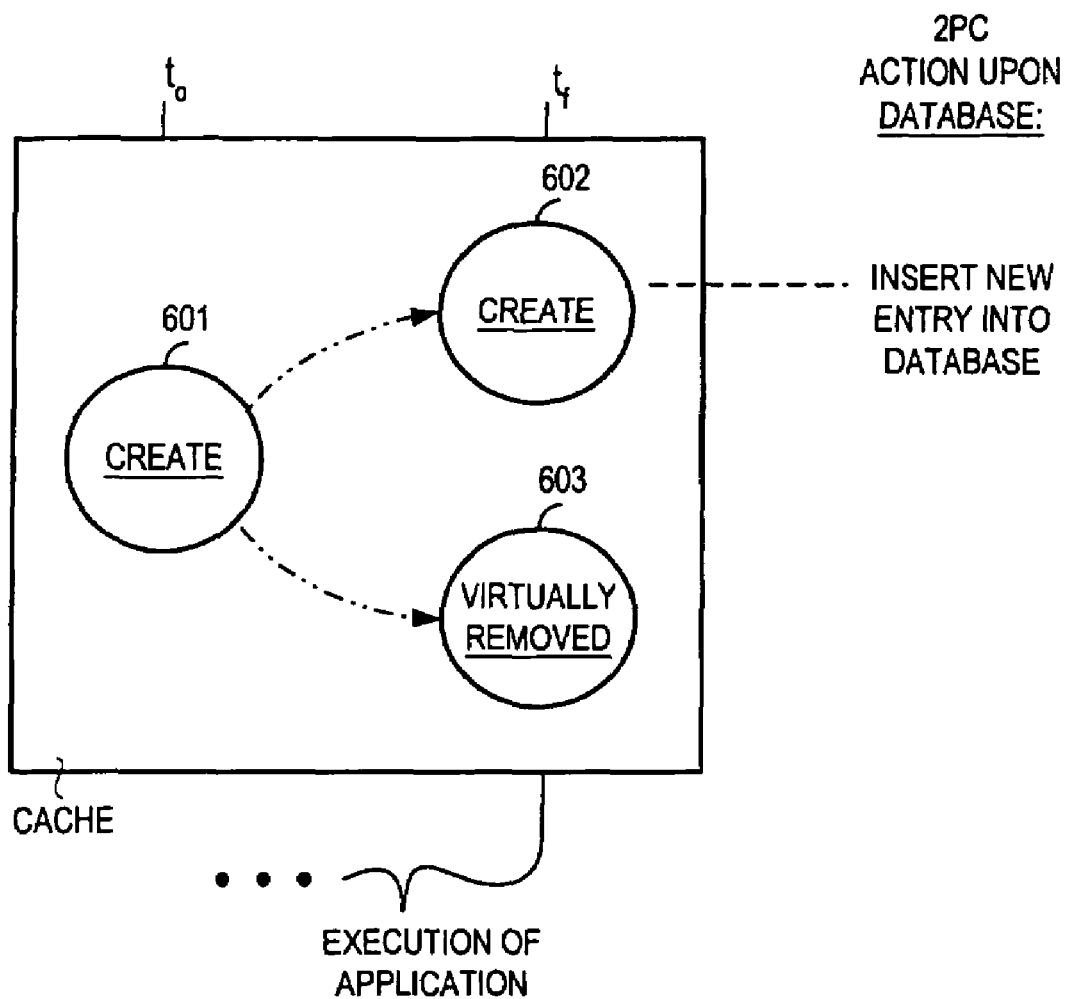
FIG. 6 shows an object stored in cache labeled as being in a CREATE state.

Over the course of an application's use of a cached object that represents an item of persistent data in a database, the state of the cached object can change. FIGS. 4 through 6 discuss such changes. FIG. 4 shows an object 401 that represents a persistent data entry being read from a database at time $t_0$ and stored into a cache. Note that the object is in the default state 401. Here, time $t_0$ can viewed as corresponding to the start time of an application that uses such data; or, the time that an application that uses such data first realizes its need for it (which could be considerably later than the start of the application that uses it). Time $t_x$ can be viewed as a time at which the object is labeled as being in a removed state 402 in response to a decision by the application that the object's corresponding database entry is to be removed. According to the state diagrams of FIGS. 3a and 3b, the remove state 402 could have been entered directly from the default state 401; or, from an update state where one or more changes were made to the data between time $t_0$ and $t_x$.

Time $t_f$ is the time at which the application is sufficiently complete so that the changes that need to be made to the persistent data as a consequence of the application's execution are known. Again from the state diagrams of FIGS. 3a and 3b, once the object was in the remove state 402 at time $t_x$, the object could ultimately transition to the update state 403 or remove state 404 by time $t_f$. If the update state 403 was ultimately reached by time $t_f$ the two phase commit protocol would write the object's data into the database. If the remove state 404 was ultimately reached by time $t_f$ the two-phase commit protocol would cause the object's corresponding data entry to be removed.

In order to ultimately transition to the update state 403 by time $t_f$ per the state diagram of FIG. 3d, a need for the object's must have occurred so as to transition to the update state (and, conceivably, multiple remove decisions may have been made between times $t_x$ and $t_f$ provided there was a transition to the update state for each removal decision). The remove state 404 may be ultimately reached by time $t_f$ without any state changes between times $t_x$ and $t_f$; or, with a repeating chain of "remove-to-update" state changes between times $t_x$ and $t_f$ where a final remove state was never changed from.

FIG. 5 shows an object being read from the database at time $t_0$. Again, note that the object is initially placed in the default state 501. Time $t_x$ can be viewed as a time at which the object is labeled as being in an update state 502 in response to a decision by the application that uses it to change its corresponding persistent data. According to the state diagrams of FIGS. 3a, b and d, the remove state 502 could have been entered directly from the default state 501; or, from one or more chains of "remove-to-update" state transitions between time $t_0$ and $t_x$.

Once the object was in the update state 502 at time $t_x$, the object could ultimately remain in the update state 503 or transition to the remove state 504 by time $t_f$. If the update state 503 was ultimately reached by time $t_f$ the two phase commit protocol would write the object's data into the database. If the remove state 504 was ultimately reached by time $t_f$ the two-phase commit protocol would cause the object's corresponding data entry to be removed.

In order to be in the update state 503 by time $t_f$: 1) the object's data may have never been changed between times $t_x$ and $t_f$; 2) the object's data may have been changed many times between times $t_x$ and $t_f$; 3) the object's state may have transitioned one or more times in chains of "remove-to-update" state transitions where each remove state was cured by a transition to the update state as per FIG. 3d In order for the remove state 504 to have been entered the remove state must have been entered at least once with the last remove state never having been cured with a transition to the update state.

FIG. 6 shows an object 601 being created in the cache at time $t_0$. Note that the object 601 is placed in the create state. Per FIG. 3c, the object will be in either the create state 602 or the virtually removed state 603 at time $t_f$. If the object is in the create state 602 at time $t_f$ a new entry to which the object corresponds will be listed in the database by the two-phase commit protocol. If the object is in the virtually removed state 603 at time $t_f$, no action is taken to the database for the object during the two-phase commit protocol.

Per FIG. 3c, multiple changes or no changes to the object's data could have been made between times $t_0$ and $t_f$ if the data object ultimately reached the create state 602 at time $t_f$. Also per FIG. 3c, if the object ultimately reached the virtually removed state 603 at time $t_f$, the application must have decided to remove the created object 601 between times $t_x$ and $t_f$. Moreover, referring to the 305 to 303c state transition of FIG. 3, note that conceivably the create state 602 could be reached at time $t_f$ if the application between times $t_0$ and $t_f$: 1) decided that the object was no longer needed to place it in the "virtually removed" state; and, 2) subsequently changed its mind (e.g., with another create command) to place it back into the "create" state.

Of course, if an object is in the default state at time $t_f$, no action is taken to the database on behalf of the object.

Note that in each of the cases discussed above with respect to FIGS. 4 though 6, the object was only read from the database once.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
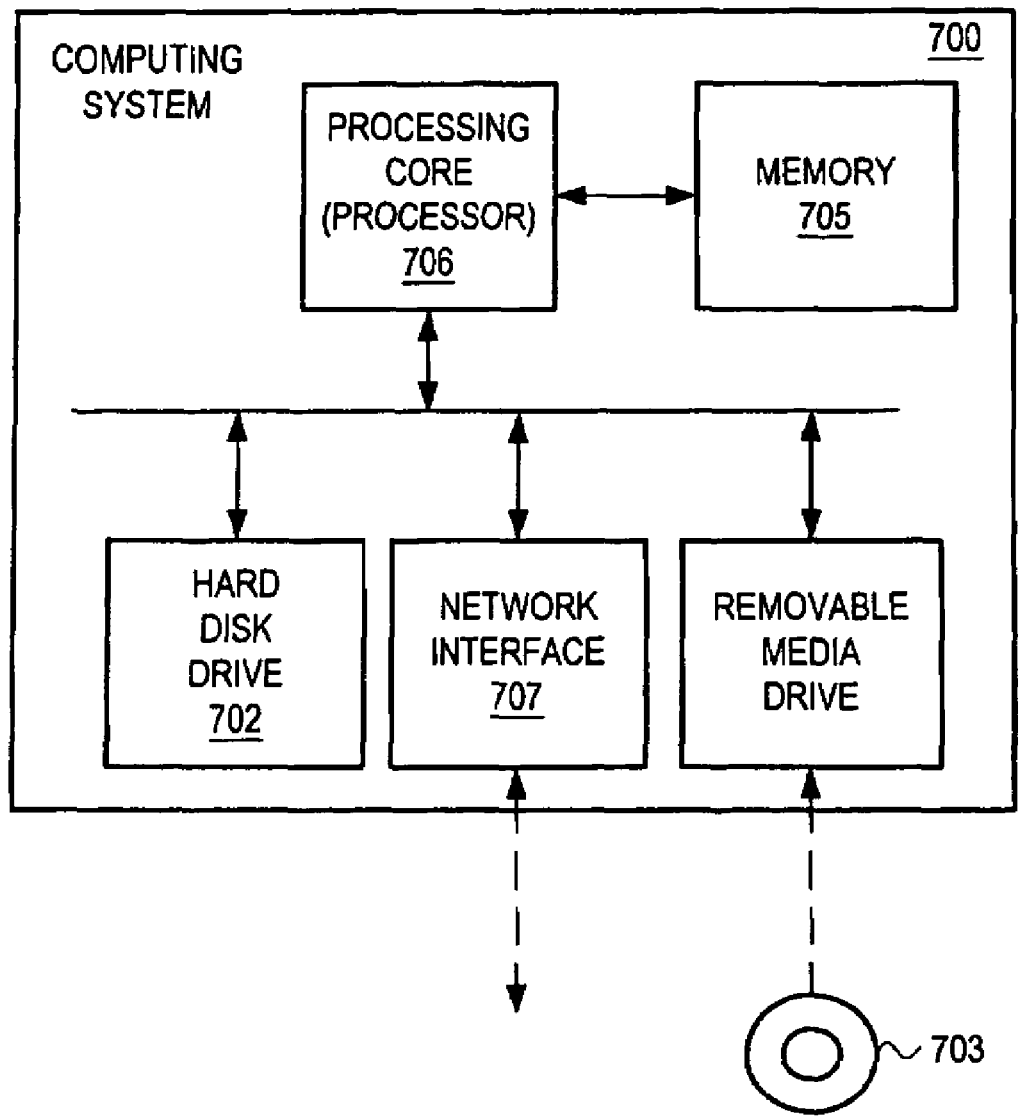
FIG. 7 shows an embodiment of a computing system

FIG. 7 is a block diagram of a computing system 700 that can execute program code stored by an article of manufacture. It is important to recognize that the computing system block diagram of FIG. 7 is just one of various computing system architectures. The applicable article of manufacture may include one or more fixed components (such as a hard disk drive 702 or memory 705) and/or various movable components such as a CD ROM 703, a compact disc, a magnetic tape, etc. In order to execute the program code, typically instructions of the program code are loaded into the Random Access Memory (RAM) 705; and, the processing core 706 then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
   during execution of a distributed transaction:
   a) placing into a cache a representation of persistent data stored at an entry in a database;
   b) in response to an application's decision that said entry should be removed from said database, keeping said representation in said cache and marking said representation as corresponding to an entry that is to be removed from said database, and, updating a list with the identity of said representation, said list listing cached entries of persistent data, each one of said cached entries marked during said distributed transaction as a database entry that is to be removed from its respective database; and,
   c) during execution of said distributed transaction's two-phase commit protocol, referring to said list to identify each one of those cached representations of persistent data that is marked as corresponding to an entry that is to be removed from its respective database when said application's execution for said distributed transaction is complete, and, informing each said respective database that it is to remove its corresponding entry identified from said list.

2. The method of claim 1 wherein said representation is an object.

3. The method of claim 2 wherein said object is an entity bean.

4. The method of claim 1 wherein said reading and said informing is performed with the assistance of a resource manager.

5. The method of claim 4 wherein said resource manager is a JDBC resource manager.

6. The method of claim 4 wherein said resource manager is an ODBC resource manager.

7. The method of claim 1 wherein said
   "placing into a cache a representation of persistent data stored at an entry in a database" in a)
   is performed by:
   placing into a cache a representation of persistent data stored at an entry in a database, said representation marked as being in a default state.

8. The method of claim 7 further comprising changing said default state to a remove state as a consequence of said application's decision, said marking being said changing.

9. The method of claim 7 further comprising, between a) and b), changing said representation to represent a new value for said data and changing said default state to an update state, and, adding the identity of said representation to a second list, said second list listing cached representations of persistent data that are marked as being updated.

10. The method of claim 9 further comprising changing said update state to a remove state as a consequence of said application's decision, said marking being said changing of said update state to said remove state.

11. The method of claim 9 wherein said representations comprise objects.

12. The method of claim 11 wherein said objects are entity beans.

13. The method of claim 11 wherein said list is kept within a transaction context.

14. The method of claim 11 further comprising
    during execution of said distributed transaction's two-phase commit protocol, referring to said second list to identify each one of those cached representations of Persistent data that is marked as corresponding to an entry that is to be updated within its respective database when said application's execution for said distributed transaction is complete, and, informing each said respective database of the update it needs to make its corresponding entry identified from said second list.

15. The method of claim 14 further comprising
    during execution of said distributed transaction's two-phase commit protocol, referring to a third list to identify each one of those cached representations of persistent data that is marked as corresponding to an entry that is to be newly created within a respective database when said application's execution for said distributed transaction is complete, and, informing each said respective database of the new entry it needs to make for its corresponding representation identified from said third list.

16. An article of manufacture including program code which, when processed by a machine, causes the machine to perform a method, the method comprising:
    during execution of a distributed transaction:
    a) placing into a cache a representation of persistent data stored at an entry in a database;
    b) in response to an application's decision that said entry should be removed from said database, keeping said representation in said cache and marking said representation as corresponding to an entry that is to be removed from said database, and, updating a list with the identity of said representation, said list listing cached entries of persistent data, each one of said cached entries marked during said distributed transaction as a database entry that is to be removed from its respective database; and,
    c) during execution of said distributed transaction's two-phase commit protocol, referring to said list to identify each one of those cached representations of persistent data that is marked as corresponding to an entry that is to be removed from its respective database when said application's execution for said distributed transaction is complete, and, informing each said respective database that it is to remove its corresponding entry identified from said list.

17. The article of manufacture of claim 16 wherein said representation is an object.

18. The article of manufacture of claim 17 wherein said object is an entity bean.

19. The article of manufacture of claim 16 wherein said reading and said informing is performed with the assistance of a resource manager.

20. The article of manufacture of claim 19 wherein said resource manager is a JDBC resource manager.

21. The article of manufacture of claim 19 wherein said resource manager is an ODBC resource manager.

22. The article of manufacture of claim 16 wherein said "placing into a cache a representation of persistent data stored at an entry in a database" in a)
is performed by:
placing into a cache a representation of persistent data stored at an entry in a database, said representation marked as being in a default state.

23. The article of manufacture of claim 22 wherein said method further comprises changing said default state to a remove state as a consequence of said application's decision, said marking being said changing.

24. The article of manufacture of claim 22 wherein said method further comprises, between a) and b), changing said representation to represent a new value for said data and changing said default state to an update state, and, adding the identity of said representation to a second list, said second list listing cached representations of persistent data that are marked as being updated.

25. The article of manufacture of claim 24 wherein said method further comprises changing said update state to a remove state as a consequence of said application's decision, said marking being said changing of said update state to said remove state.

26. The article of manufacture of claim 24 wherein said representations comprise objects.

27. The article of manufacture of claim 26 wherein said objects are entity beans.

28. The article of manufacture of claim 26 wherein said list is kept within a transaction context.

29. The article of manufacture of claim 26 wherein said method further comprises
during execution of said distributed transaction's two-phase commit protocol, referring to said second list to identify each one of those cached representations of persistent data that is marked as corresponding to an entry that is to be updated within its respective database when said application's execution for said distributed transaction is complete, and, informing each said respective database of the update it needs to make its corresponding entry identified from said second list.

30. The article of manufacture of claim 29 wherein said method further comprises
during execution of said distributed transaction's two-phase commit protocol, referring to a third list to identify each one of those cached representations of persistent data that is marked as corresponding to an entry that is to be newly created within a respective database when said application's execution for said distributed transaction is complete, and, informing each said respective database of the new entry it needs to make for its corresponding representation identified from said third list.

31. A computing system comprising program code disposed on a computer readable medium, said program code capable of being processed by a machine within said computing system to perform a method, said method comprising:
during execution of a distributed transaction:
a) placing into a cache a representation of persistent data stored at an entry in a database;
b) in response to an application's decision that said entry should be removed from said database keeping said representation in said cache and marking said representation as corresponding to an entry that is to be removed from said database, and, updating a list with the identity of said representation, said list listing cached entries of persistent data, each one of said cached entries marked during said distributed transaction as a database entry that is to be removed from its respective database; and,
c) during execution of said distributed transaction's two-phase commit protocol, referring to said list to identify each one of those cached representations of persistent data that is marked as corresponding to an entry that is to be removed from its respective database when said application's execution for said distributed transaction is complete, and, informing each said respective database that it is to remove its corresponding entry identified from said list.

32. The computing system of claim 31 wherein said representation is an object.

33. The computing system of claim 32 wherein said object is an entity bean.

34. The computing system of claim 31 wherein said reading and said informing is performed with the assistance of a resource manager.

35. The computing system of claim 34 wherein said resource manager is a JDBC resource manager.

36. The computing system of claim 34 wherein said resource manager is an ODBC resource manager.

37. The computing system of claim 31 wherein said "placing into a cache a representation of persistent data stored at an entry in a database" in a)
is performed by:
placing into a cache a representation of persistent data stored at an entry in a database, said representation marked as being in a default state.

38. The computing system of claim 37 wherein said method further comprises changing said default state to a remove state as a consequence of said application's decision, said marking being said changing.

39. The computing system of claim 37 wherein said method further comprises, between a) and b), changing said representation to represent a new value for said data and changing said default state to an update state, and, adding the identity of said representation to a second list, said second list listing cached representations of persistent data that are marked as being updated.

40. The computing system of claim 39 wherein said method further comprises changing said update state to a remove state as a consequence of said application's decision, said marking being said changing of said update state to said remove state.

41. The computing system of claim 39 wherein said representations comprise objects.

42. The computing system of claim 41 wherein said objects are entity beans.

43. The computing system of claim 41 wherein said list is kept within a transaction context.

44. The computing system of claim 41 wherein said method further comprises
during execution of said distributed transaction's two-phase commit protocol, referring to said second list to identify each one of those cached representations of persistent data that is marked as corresponding to an entry that is to be updated within its respective database when said application's execution for said distributed transaction is complete, and, informing each said respective database of the update it needs to make its corresponding entry identified from said second list.

45. The computing system of claim 44 wherein said method further comprises during execution of said distributed transaction's two-phase commit protocol, referring to a third list to identify each one of those cached representations of persistent data that is marked as corresponding to an entry that is to be newly created within a respective database when said application's execution for said distributed transaction is complete, and, informing each said respective database of the new entry it needs to make for its corresponding representation identified from said third list.

* * * * *